Figure 6:
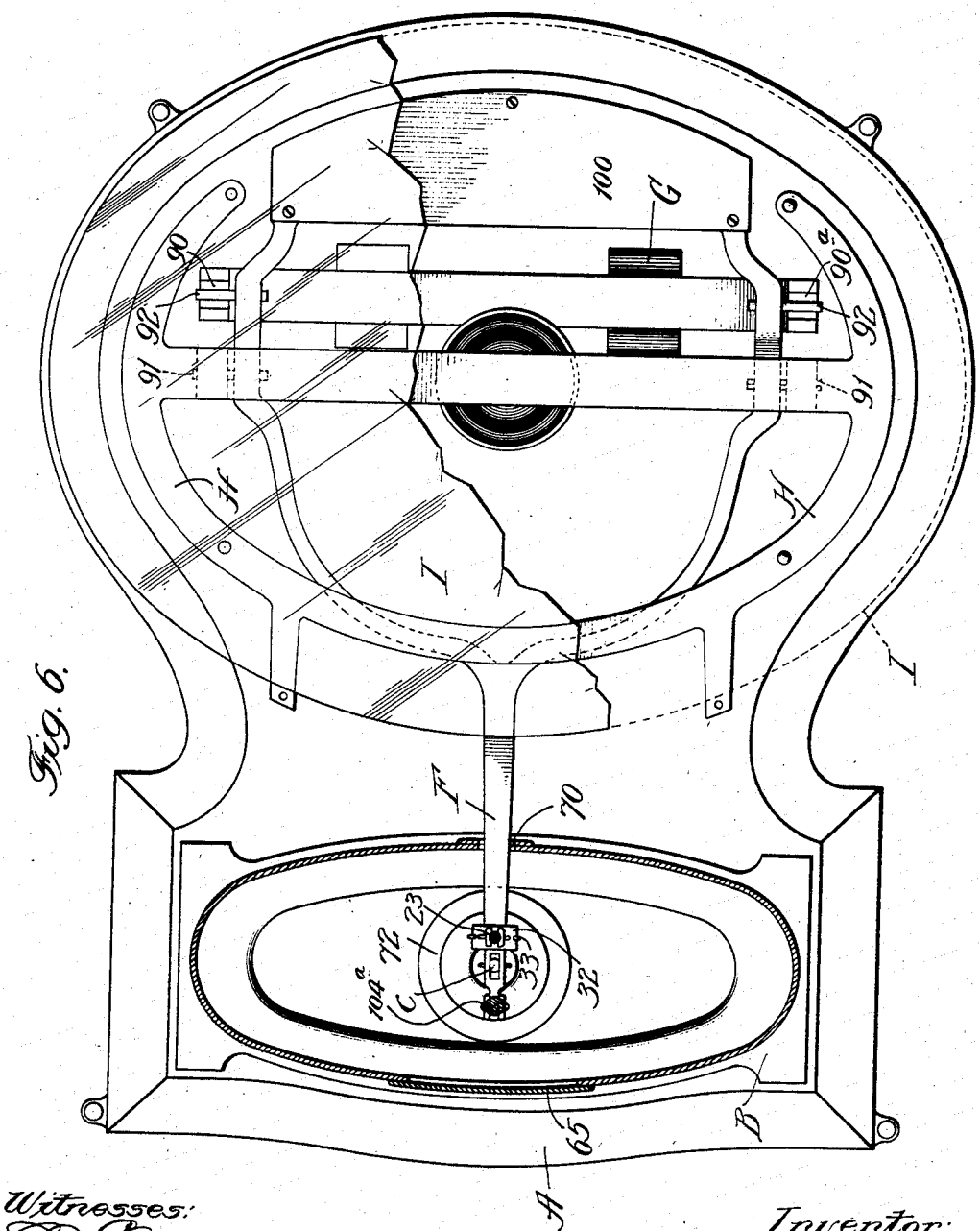

C. G. STRUBLER.
COMPUTING SCALE.
APPLICATION FILED FEB. 8, 1913.
1,213,296.
Patented Jan. 23, 1917.
3 SHEETS—SHEET 1.
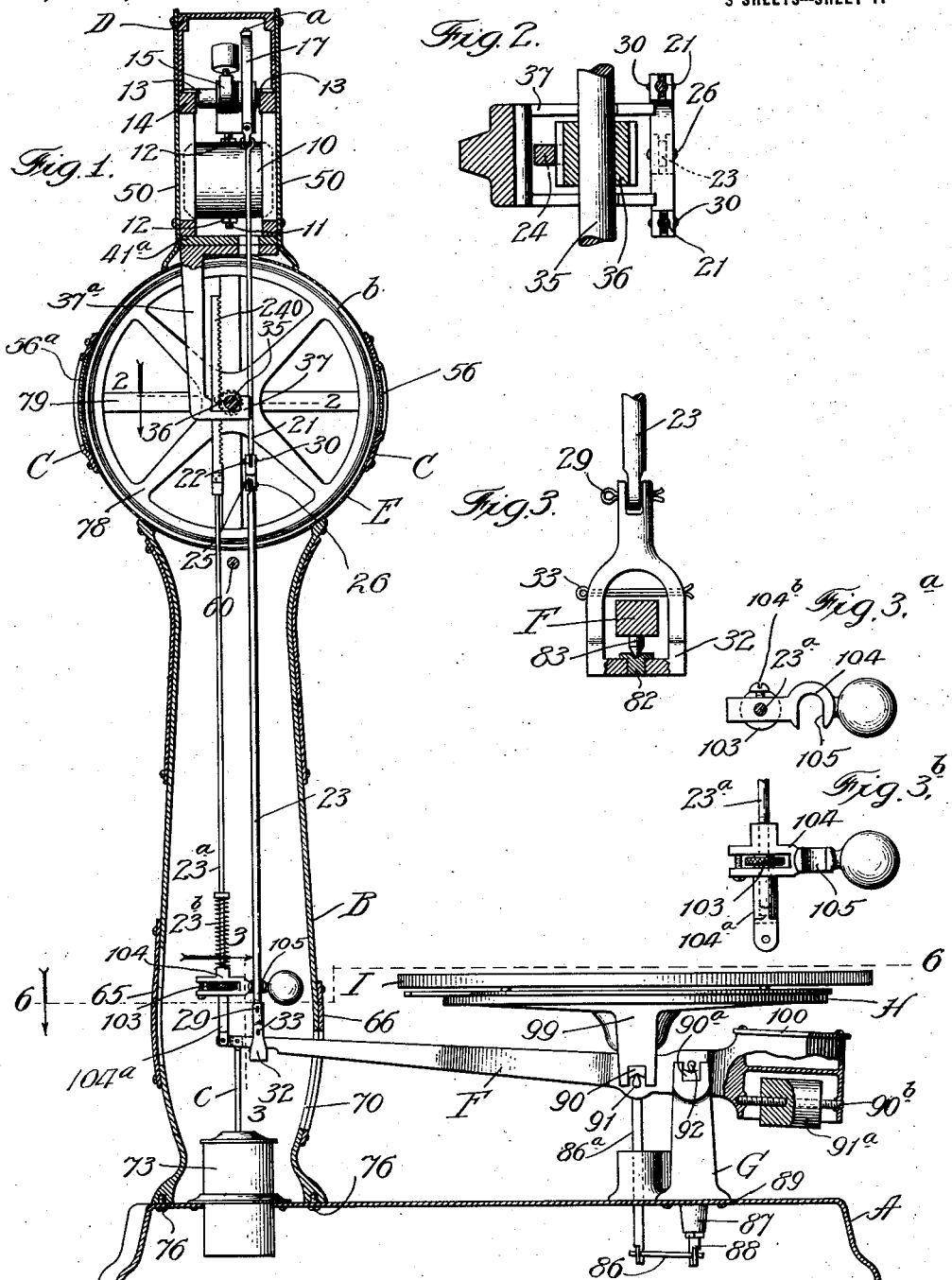

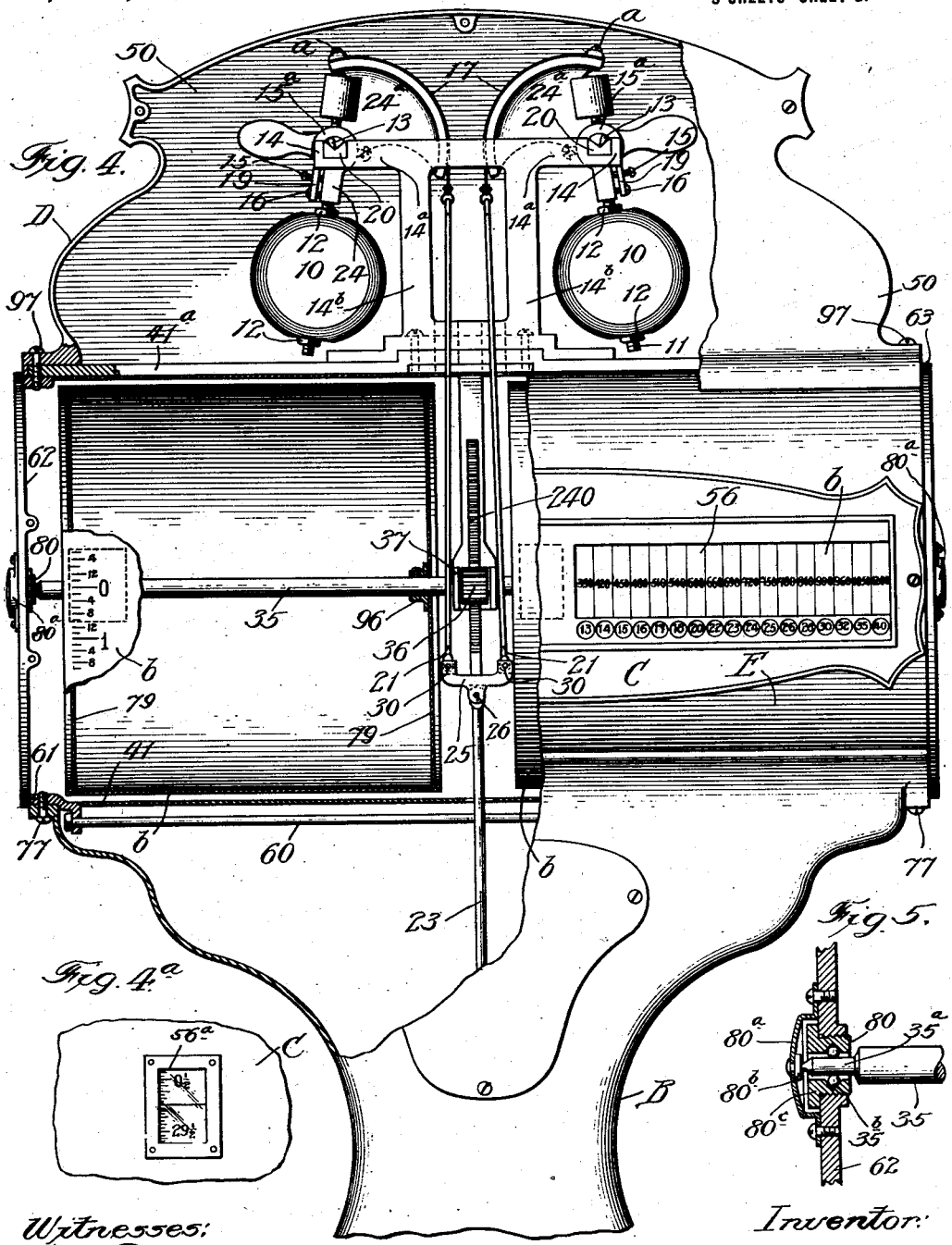

C. G. STRUBLER.
COMPUTING SCALE.
APPLICATION FILED FEB. 8, 1913.

1,213,296.

Patented Jan. 23, 1917.
3 SHEETS—SHEET 3.

Witnesses:
Inventor:
Charles G. Strubler

UNITED STATES PATENT OFFICE.

CHARLES G. STRUBLER, OF ELKHART, INDIANA, ASSIGNOR TO STRUBLER COMPUTING SCALE COMPANY, OF ELKHART, INDIANA, A CORPORATION OF INDIANA.

COMPUTING-SCALE.

1,213,296.  Specification of Letters Patent.  Patented Jan. 23, 1917.

Application filed February 8, 1913. Serial No. 747,197.

*To all whom it may concern:*

Be it known that I, CHARLES G. STRUBLER, a citizen of the United States, and a resident of Elkhart, in the county of Elkhart and State of Indiana, have invented certain new and useful Improvements in Computing-Scales; and I do hereby declare that the following is a full, clear, and exact description thereof, reference being had to the accompanying drawings, and to the characters of reference marked thereon, which form a part of this specification.

This invention relates to improvements in platform drum scales of the automatic computing type, and the invention consists in the novel construction and combination of parts hereinafter described and more particularly pointed out in the appended claims.

Among the objects of the invention is to provide an improved simple, reliable and efficient construction, and a construction having simple and positive means of adjustment of the parts whereby the scale is rendered extremely sensitive and accurate, and further a construction wherein the friction of the weighing element is reduced to and maintained at a minimum.

In the drawings:—Figure 1 is a partial side elevation and partial vertical section of a scale embodying my improvements. Fig. 2 is a detail horizontal section on the line 2—2 of Fig. 1. Fig. 3 is a detail section on the line 3—3 of Fig. 1. Fig. 3$^a$ is a plan view of the rack bar adjusting and balancing device. Fig. 3$^b$ is a side view thereof. Fig. 4 is a partial front elevation and partial vertical section of the upper or drum carrying part of the scale. Fig. 4$^a$ is a fragmentary rear elevation illustrating the sight opening on the customer's side of the scale. Fig. 5 is a fragmentary vertical section taken through one end wall of the drum casing, and showing the drum shaft and anti-friction bearings therefor. Fig. 6 is a horizontal section on the line 6—6 of Fig. 1, with parts broken away.

As shown in the drawings, A designates the scale base, G an upright fulcrum stand supported thereon and attached thereto by the screws 89 and F the scale lever or beam pivoted to the fulcrum stand through the medium of the usual hardened and knife edge bearings 90$^a$ and 92, respectively. The scale lever is counterweighted at its outer end 100 by a counterweight 91$^a$ adjustably mounted on a screw 90$^b$.

I designates a platform supported on a sub-base H, the depending legs 99 of which are provided with downwardly facing hardened bearings 90 for engagement with the knife edges 91 carried by the scale lever F. Said sub-base H is provided with a depending steadying rod 86$^a$ which is connected at its lower end by the usual check 86 with a stud 88 from which depends a hub or boss 87 on the under side of the base A.

B designates a hollow standard that is supported on one side of the base and is attached thereto by screws 76. The standard is laterally widened at its upper end and supports a casing E for the drum which carries the indicating elements of the scale. Said casing comprises end walls 62, 63 and a cylinder member 41 fitted between the end walls, the parts being clamped together by the tie bar or bridge 41$^a$ and tie rod 60. Said tie bar is attached at its ends by the screws 97 to inward projections or flanges 61 of the end plates, and the tie rod extends between lugs of said flanges, as shown in Fig. 4. The casing is attached to the standard B by screws 77 which extend through flanges on the standard and into the flanges 61 of the casing end walls. Said casing is surmounted by a hollow cap piece D removably attached thereto by the screws 97 to house parts of the scale structure, as will hereinafter appear. Contained in the said casing E is the usual price and weight chart drum $b$ made of two sections as herein shown in which are fixed bearings 96 carried by the end rings 79 of the drum and mounted on a shaft 35. The reduced ends 35$^a$ of the shaft are mounted in anti-friction bearings carried by the end walls of the casing. The said anti-friction bearings are made as follows: Each end wall of the casing has a central screw threaded opening into which is screw-threaded a ring 80 through which the reduced end of the shaft 35 extends. Said ring has an internal annular ball race between which and the shaft are interposed a plurality of anti-friction elements or balls 35$^b$. The outer ends of the reduced ends of the shaft 35 are pointed and engage hardened bearing members 80$^b$ centrally carried by caps 80$^a$ fixed to the outer face of the casing end members and covering said bearing rings. The said rings 80 are provided at their outer ends with flanges 80$^c$ to bear against the outer sides of the casing end plates and thus constitute stops to determine the positions of the ball race rings relatively to said end plates or walls. The bearing construction described provides a bearing of minimum friction, and also a bearing in which the parts are held in fixed positions, yet delicately poised positions.

The scale lever or beam extends through a slot 70 of a guide plate 66 and said lever is connected at its end remote from the counterweight 91$^a$ to the lower end of a draw bar 23, which latter is connected at its upper end in the manner hereinafter described, to weighted load counterpoise levers or pendulums 24, contained within the hollow cap piece or housing D. The connection between said draw bar and scale lever is best shown in Figs. 1 and 3 and is made as follows: Pivoted to the lower end of the draw bar, as by the pin 29, is a stirrup 32 through which the end of the scale lever F extends. The lower member of the stirrup is provided with a hardened bearing 82 for engagement by a pointed bearing lug 83 depending from the scale lever. The scale lever is held from rising by means of a pin 33 which extends through the side members of the stirrup.

The upper end of the draw bar is pivotally or loosely connected at 26 (Fig. 4) centrally to an evener 25 arranged between the drum sections $b, b$. The upstanding arms of said evener are pivotally connected to the lower ends of evener links 21, 21, which latter are connected to flexible bands or tapes 17, 17 that are trained about and fixed at $a$ to the eccentric segmental end 24$^a$ of the weighted or load counterpoise levers or pendulums 24. The said weighted counterpoise levers 24 are pivoted, as by means of the knife edge pivots 13, 13, on the hubs 15$^a$, 15$^a$ of said levers, which pivots engage hardened coöperating members 20 mounted in the outer ends 14 of arms 14$^a$ of upstanding brackets 14$^b$, 14$^b$ that are supported upon and are fixed to the tie bar or bridge 41$^a$, as shown in Figs. 1 and 4.

The said pendulums 24 carry load counterpoising weights 10, shown as mounted on the lower screw-threaded ends 11 of the levers and confined between the nuts 12, 12. This arrangement of the nuts and screw-threaded levers permits the weights to be adjusted on the levers to thereby adjust the scale for accurate weighing. The said weights are elongated and are arranged with their axes horizontal and transversely of the hollow cap plate D. This arrangement is advantageous inasmuch as it permits weights of ample size to be employed in a moderate vertical space. Moreover, considerable vertical space is saved and the height of the scale lessened by mounting the counterpoise lever brackets on the bridge piece 41$^a$ instead of attaching it to and depending it from the top wall of the hollow cap D. Furthermore, by supporting the said bracket on the bridge piece it is rigidly connected to a substantial portion of the frame so as to minimize danger of the parts getting out of proper alinement. Inasmuch as no part of the mechanism is carried by the hollow cap D, the said cap may be removed for purposes of inspecting the mechanism beneath without in any way deranging the working parts. For the same reason, the cap may be made of relatively light material.

The arrangement of the counterpoise elements above the drum and the scale levers as shown renders the scale extremely sensitive and the two counterpoise elements have a self-compensating action such as to avoid unbalancing the scale when it rests on a non-level support.

The connection between the weight and price chart drum and the scale lever or beam is made as follows: The drum shaft 35 is provided at the space between the drum sections with a pinion 36 which is engaged by a vertically movable rack bar 240. 23$^a$ is a rod that is attached at its upper end to said rack bar and is screw-threaded at its lower end to engage an adjusting nut 103 carried between the arms of a slotted fitting 104, said fitting having guide openings above and below said arms in which the rod 23$^a$ slides. The lower guide opening is shown as formed in a stem 104$^a$ which is pivoted at its lower end to the free end of the scale lever F. A spring 23$^b$ surrounds the rod 23$^a$ between the fitting 104 and a collar on the rod and holds the parts up against each other in a manner to avoid lost motion between the scale lever and the rack bar when a load is placed on the scale platform. The said fitting is provided with a guide notch 105 adapted to engage over the draw bar 23 and is provided at its free end with an enlargement to constitute a weight which acts on the rack bar extension rod 23$^a$ to hold the rack bar against its pinion.

By manipulation of the nut 103 the chart carried by the drum may be accurately adjusted to its zero position when the scale is in balance and be maintained in such adjustment. If desired, the rack bar extension rod 23$^a$ may be locked to the fitting 104, after the parts have been adjusted, as by means of the screw 104$^b$. The hollow standard is provided with a removable cover plate 65 to afford access to the chart drum adjusting devices and to normally protect the devices from being maliciously or mischievously tampered with.

The rack bar 240 is guided in its vertical movement and held against the pinion 36 by a guide member 37 carried by the lower end of an arm 37ª which is attached to and depends from the bridge bar 41ª.

In order to steady the action of the weighing elements of the scale a dash pot 73 is supported on the base beneath the free end of the scale lever or beam, the plunger c of which is pivotally or loosely connected with said lever.

The casing C is provided with the usual front and rear sight openings 56, 56ª, respectively, equipped with glass covers, through which the numerals of the chart are exhibited to the salesman and to the customer.

It will be understood that the structural details of the scale may be somewhat varied within the spirit and scope of the invention and that the invention is not limited to such details, except as hereinafter made the subject of specific claims.

I claim as my invention:—

1. In a computing scale, a pivoted scale lever, a rotatable weight and price chart supported above and connected to said lever, a plurality of counterpoise pendulums pivotally supported above said chart, a draw bar pivotally connected to said scale lever, an evener pivotally connected to the upper end of the draw bar, links loosely connected at their lower ends to the ends of said evener and extending at their upper ends adjacent to the pendulums, and tapes connecting the upper ends of said links to said pendulums.

2. In a computing scale, a pivoted scale lever, a rotatable weight and price chart supported above and connected to said lever, a plurality of counterpoise pendulums pivotally supported above said chart, and provided with eccentric extensions, a draw bar pivotally connected to said scale lever, an evener bar pivotally connected to the upper end of the draw bar, links loosely connected at their lower ends to the ends of said evener, and tapes attached to said links adjacent to the pendulums and trained about the peripheries of and attached to said eccentric extensions.

3. In a computing scale, a base, a hollow standard rising therefrom, a fixed casing surmounting the standard, a weight and price chart member mounted therein, a scale lever pivotally supported on the base, means to operatively connect said lever to said price chart member to actuate the same, counterpoise pendulums above said member, means to operatively connect said pendulums to said lever, knife edge bearings for said pendulums supported on a fixed or nonmovable part of said casing, and a removable cap member mounted on the fixed casing, and inclosing said pendulums.

4. In a computing scale, a base, a hollow standard rising therefrom, a casing surmounting the standard comprising end plates with a bridge bar extending between and connecting the same, a weight and price chart mounted therein, a scale lever operatively connected to said chart to actuate the same, counterpoise pendulums also operatively connected to said lever and therethrough to the chart and bearings for said pendulums carried by and supported on said bridge bar.

5. In a computing scale, a base, a hollow standard rising therefrom, a casing surmounting the standard comprising end plates with a bridge bar extending between and connecting same, a weight and price chart mounted therein, a scale lever operatively connected to said chart to actuate the same, counterpoise pendulums also connected to said lever and therethrough to the chart, bearings for said pendulums carried by and supported on said bridge bar and a cap member inclosing said pendulums and their bearings and removably fixed to said drum casing.

6. In a computing scale, a base, a hollow standard rising therefrom, a pivoted scale lever at the lower end of said standard, a rotatable weight and price chart mounted at the upper end of the standard, a pinion carried by the chart, a rack bar engaging the pinion, adjustable connections between the rack bar and said lever for adjusting the chart to zero position, counterpoising means above the level of the scale lever and connections between said counterpoising means and said lever.

7. In a computing scale, a base, a hollow standard rising therefrom, a pivoted scale lever at the lower end of said standard, a rotatable weight and price chart mounted at the upper end of the standard, a pinion carried by the chart, a rack bar engaging the pinion, a rod extending downwardly from the rack bar, a fitting pivoted to the scale lever in which the lower end of the rod is guided, adjusting means carried by said fitting and acting on the rod to adjust the said chart and counterpoising means above the lever and connected also to said scale lever.

8. In a computing scale, a base, a hollow standard rising therefrom, a pivoted scale lever at the lower end of said standard, a rotatable weight and price chart mounted at the upper end of the standard, a pinion carried by the chart, a rack bar engaging said pinion, a rod extending downwardly from the rack bar, a fitting pivoted to the scale lever in which the lower end of the rod is guided, a rotative adjusting nut carried by said fitting and screw-threaded to said rod, a spring surrounding the rod between a collar thereon and said fitting, and counterpoising means above said price chart and connected also to said scale lever.

9. In a computing scale, a base, a hollow standard rising therefrom, a pivoted scale lever at the lower end of said standard, a rotatable weight and price chart drum mounted at the upper end of the standard, a pinion carried by the drum, a rack bar engaging said pinion, a rod extending downwardly from the rack bar, a fitting pivoted to the scale lever in which the lower end of the rod is guided, a rotative adjusting nut carried by said fitting and screw-threaded to said rod, a collar on the rod, a spring surrounding the rod between said collar and said fitting, counterpoising means, a draw bar connected to said lever and to said counterpoising means and a guide on the fitting to engage said draw bar.

10. In a computing scale, the combination with a pivoted scale lever or beam, a price chart, a price chart actuating means, and a rod extending from said price chart actuating means to the lever, of a weighted fitting pivoted at its lower end to said lever and provided with an upwardly opening guide to receive the lower end of said rod to hold the price chart actuating means in operative relation, a nut rotative in said fitting and screw-threaded to the rod above its lower end, and yielding means to prevent lost motion between the fitting and said nut.

11. In a computing scale, the combination with the pivoted scale lever or beam, a price chart, an actuating rack bar and a pinion therefor, and a rod extending from said rack bar to the lever, of a fitting pivoted at its lower end to said lever and provided with an upwardly opening guide to receive the lower end of said rod, and a nut rotative in said fitting and screw-threaded to the lower end of said rod, said fitting being weighted at one end to press the rack bar against its pinion.

12. In a computing scale, a base, a scale lever pivoted on said base, a load supporting member carried by said lever, a rotatable weight and price chart provided with a pinion, a rack engaging said pinion, a connection between said rack and said lever, a pivoted counterpoise pendulum supported above said chart, a draw bar connected to said scale lever, an evener connected to the upper end of said draw bar, links connected at their lower ends to said evener and extending at their upper ends adjacent to said pendulums, and tapes connecting the upper ends of said links to said pendulums.

13. In a computing scale, a base, a standard rising therefrom, a casing surmounting said standard comprising end plates with a bridge bar extending between and connecting same, a weight and price chart rotatively mounted in said casing, with anti-friction bearings between the chart and said end plates, a scale lever pivotally mounted on said base, with means to operatively connect it to said chart to actuate the latter and a pivoted counterpoise pendulum on said bridge bar, with means to operatively connect it to said lever and to said chart.

14. In a computing scale, a base, a standard rising therefrom, a casing surmounting said standard comprising end plates with a bridge bar extending between and connecting same, a weight and price chart rotatively mounted in said casing with anti-friction bearings between the chart and said end plates, a scale lever pivotally mounted on said base, with means to operatively connect it to said chart to actuate the latter, a pivoted counterpoise pendulum on said bridge bar, with means to operatively connect it to said lever and said chart, said casing being provided in its front and rear sides with sight openings for the customer and salesman, respectively.

15. In a computing scale, a base, a hollow standard rising therefrom, a pivoted scale lever at the lower end of said standard, a rotatable weight and price chart mounted at the upper end of the standard, a pinion carried by the chart, a rack bar engaging the pinion, adjustable connections between the rack bar and said lever, for adjusting the chart to zero position, a counterpoising weight above the level of the scale lever, connections between said counterpoising weight and said lever separate from the connections between said lever and rack bar, and a dash pot connected to and controlling the action of said scale lever.

16. In a computing scale, a standard having an enlargement to receive a drum chart and above said enlargement with a hollow cap piece, a drum chart rotatively mounted in said enlargement, a scale beam connected to and actuating said chart and an elongated counterpoise weight in the cap piece connected to the scale beam and chart, the longer axis of said counterpoise weight being horizontally disposed.

In testimony, that I claim the foregoing as my invention, I affix my signature in the presence of two witnesses, this 6th day of February 1913.

CHARLES G. STRUBLER.

Witnesses:
    LUELLA M. COLBURN,
    DAVID M. HOOVER.